US008936384B2

(12) United States Patent
Barth et al.

(10) Patent No.: US 8,936,384 B2
(45) Date of Patent: Jan. 20, 2015

(54) PLANAR LIGHT GUIDE AND LIGHTING DEVICE

(75) Inventors: Andreas Barth, Schnaittach (DE); Julius Muschaweck, Gauting (DE); Uli Hiller, Bad Abbach (DE); Michael Sailer, Wolfskofen (DE)

(73) Assignee: OSRAM Opto Semiconductors GmbH (DE)

( * ) Notice: Subject to any disclaimer, the term of this patent is extended or adjusted under 35 U.S.C. 154(b) by 233 days.

(21) Appl. No.: 13/695,802

(22) PCT Filed: Mar. 21, 2011

(86) PCT No.: PCT/EP2011/054231
§ 371 (c)(1),
(2), (4) Date: Dec. 26, 2012

(87) PCT Pub. No.: WO2011/138086
PCT Pub. Date: Nov. 10, 2011

(65) Prior Publication Data
US 2013/0121024 A1 May 16, 2013

(30) Foreign Application Priority Data

May 3, 2010 (DE) .......................... 10 2010 019 051

(51) Int. Cl.
*F21V 7/04* (2006.01)
*F21V 8/00* (2006.01)
(52) U.S. Cl.
CPC ............ *G02B 6/0035* (2013.01); *G02B 6/0038* (2013.01); *G02B 6/0061* (2013.01); *G02B 6/0051* (2013.01)
USPC ............................ 362/607; 362/606; 362/615

(58) Field of Classification Search
USPC .......................................... 362/606, 607, 615
See application file for complete search history.

(56) References Cited

U.S. PATENT DOCUMENTS

| 5,550,676 | A | 8/1996 | Ohe et al. |
|---|---|---|---|
| 6,099,134 | A | 8/2000 | Taniguchi et al. |
| 2007/0103938 | A1 | 5/2007 | Chang et al. |
| 2008/0138024 | A1 | 6/2008 | Parker et al. |
| 2009/0073721 | A1 | 3/2009 | Kamikatano et al. |
| 2009/0086509 | A1 | 4/2009 | Omori et al. |
| 2010/0053976 | A1* | 3/2010 | Cornelissen et al. ......... 362/297 |
| 2012/0113678 | A1* | 5/2012 | Cornelissen et al. ......... 362/607 |

FOREIGN PATENT DOCUMENTS

EP 1 260 853 A1 11/2002

* cited by examiner

*Primary Examiner* — Vip Patel
(74) *Attorney, Agent, or Firm* — DLA Piper LLP (US)

(57) ABSTRACT

A planar light guide includes a main body with a back face and a radiation outcoupling face opposite thereto, a main direction of light guidance parallel to the radiation outcoupling face, at least one plurality of identically shaped and identically oriented outcoupling structures formed on at least one of the main faces, and at least one structure main face per outcoupling structure, wherein an angle-dependent emission characteristic is provided asymmetrically in a first plane parallel to the main direction of light guidance and perpendicular to the radiation outcoupling face.

12 Claims, 14 Drawing Sheets

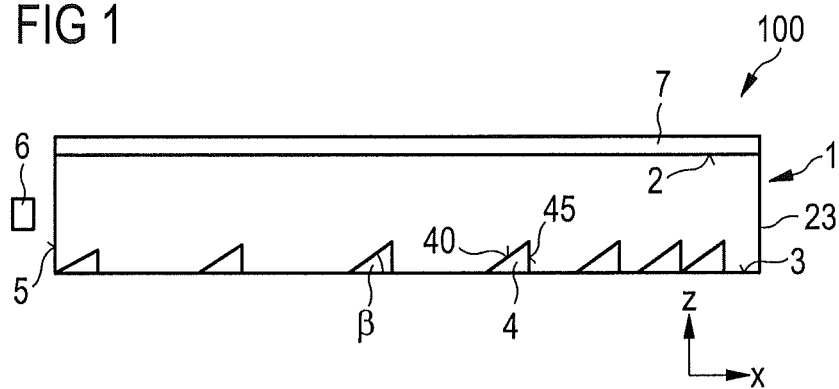
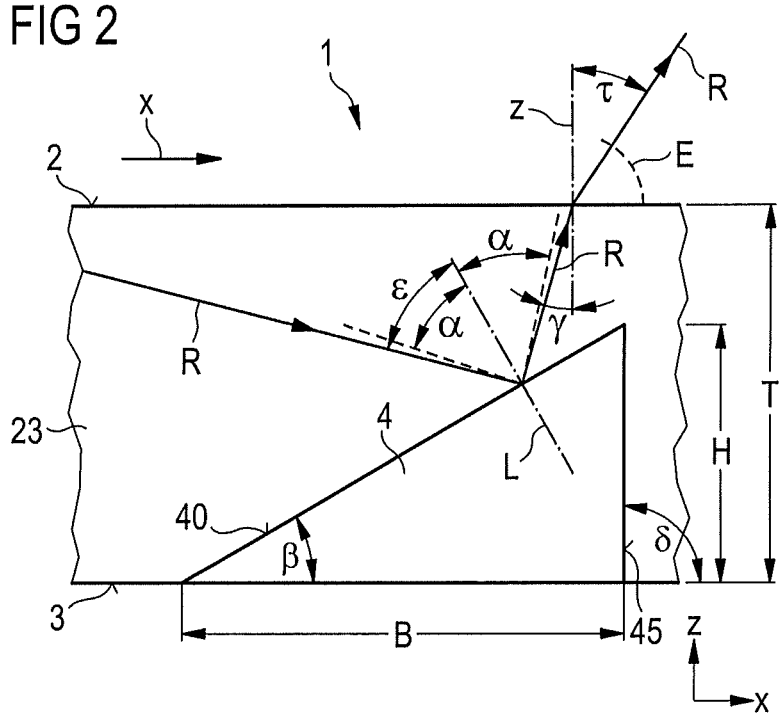

FIG 3
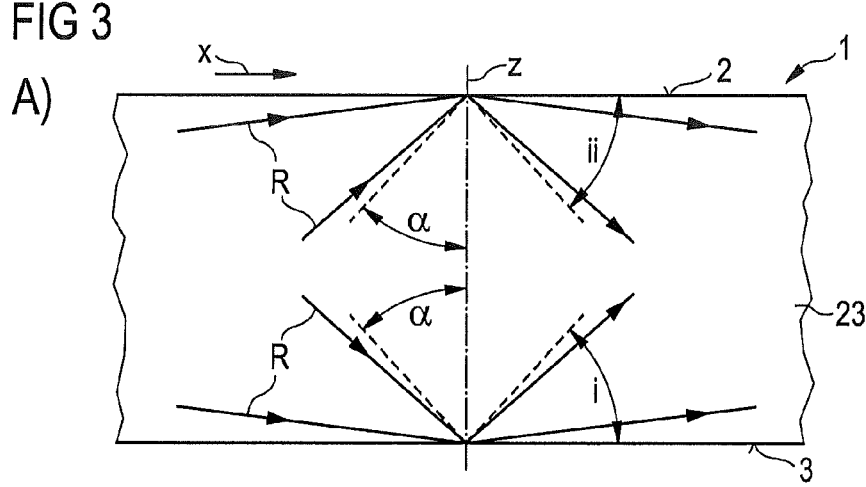
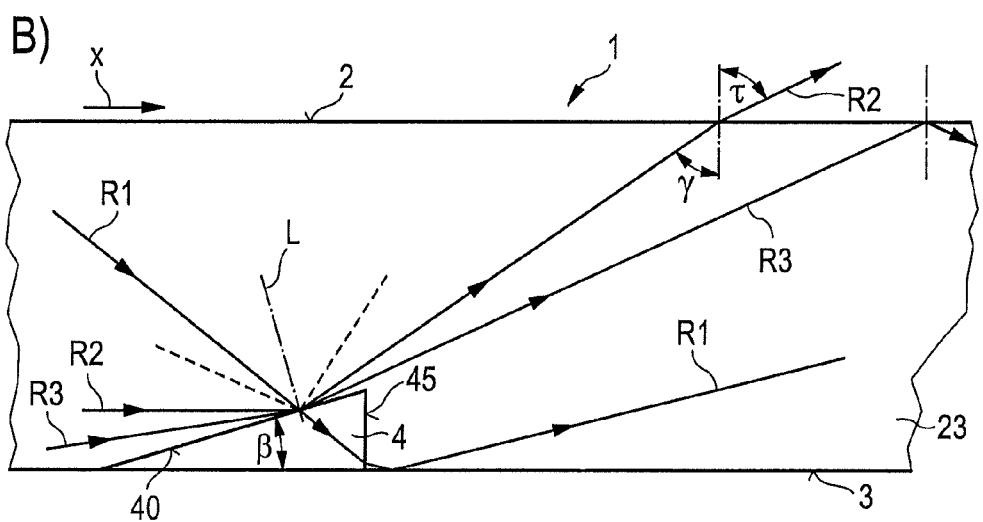
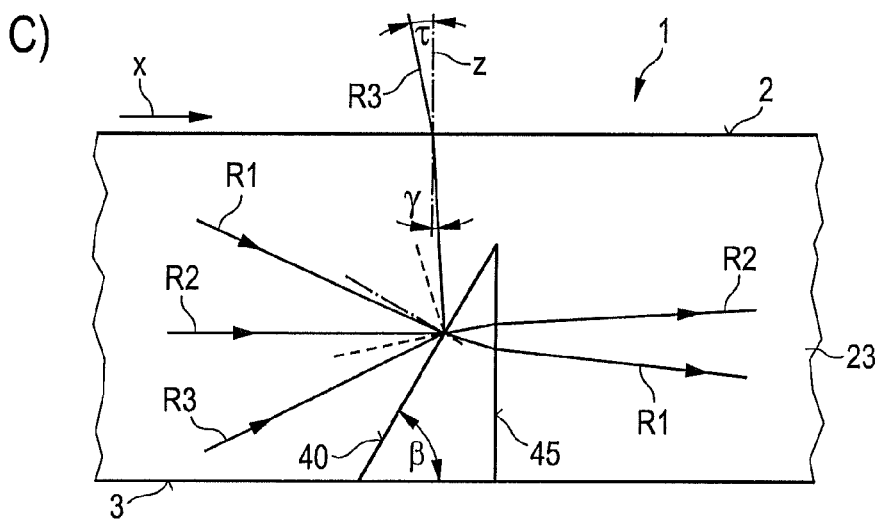

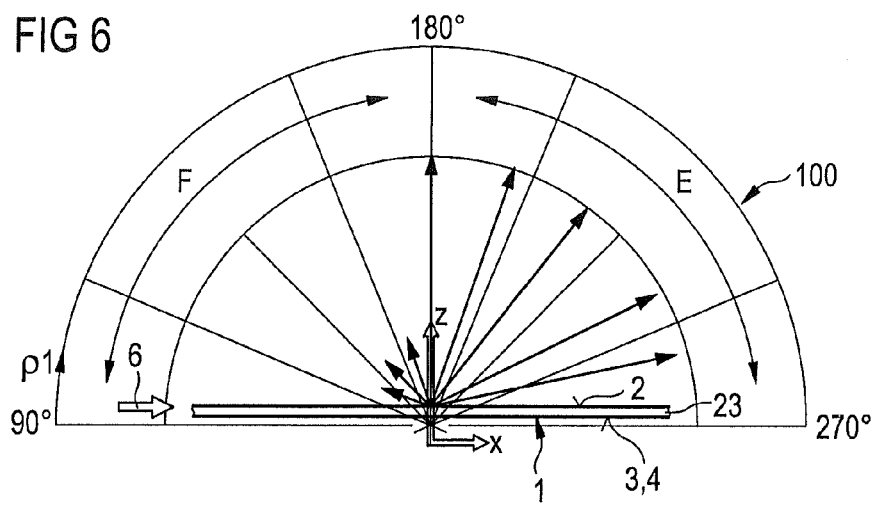
FIG 6
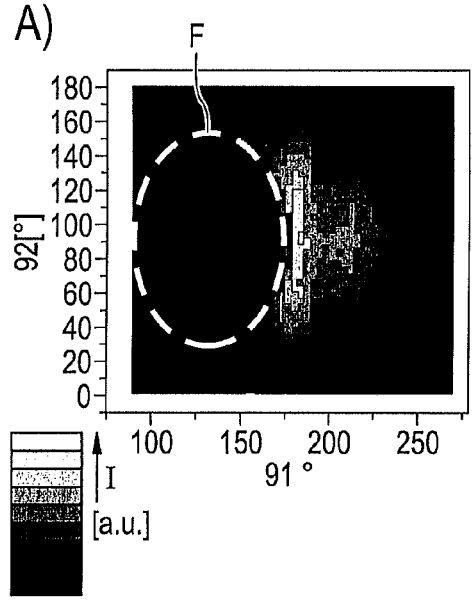
FIG 7
A)
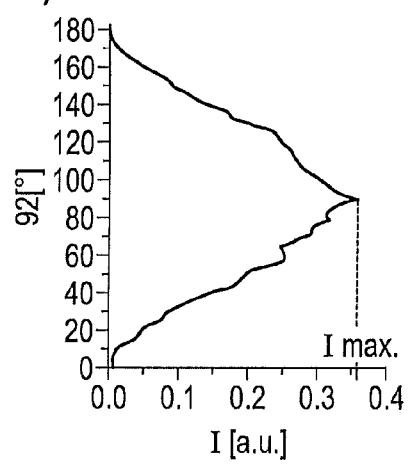
B)
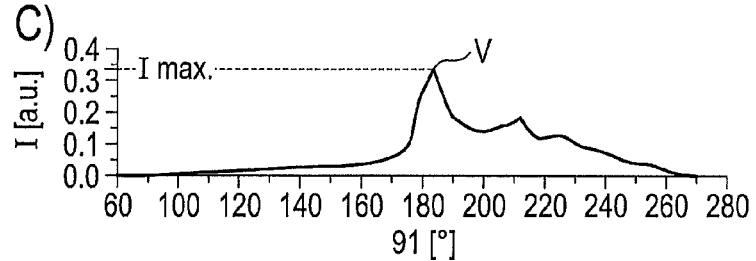
C)

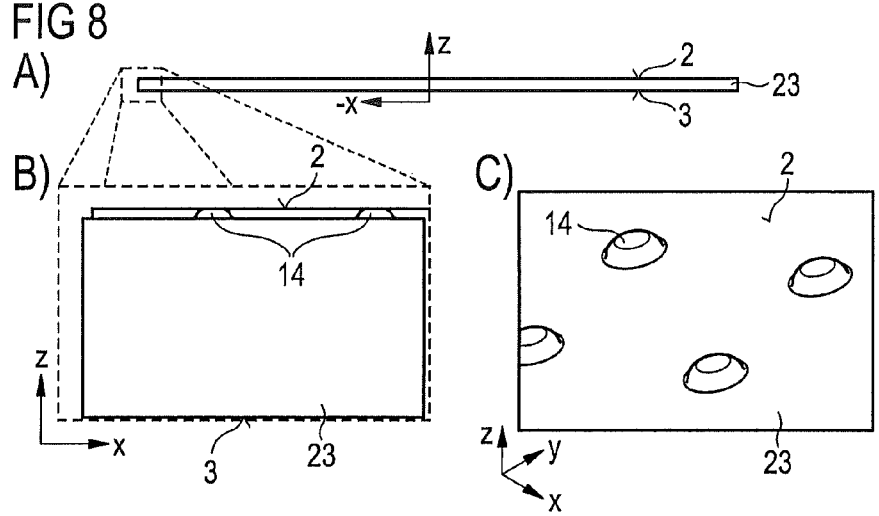
FIG 8
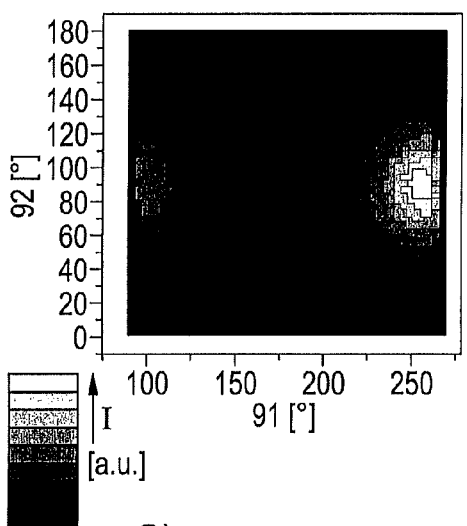
FIG 9
A)
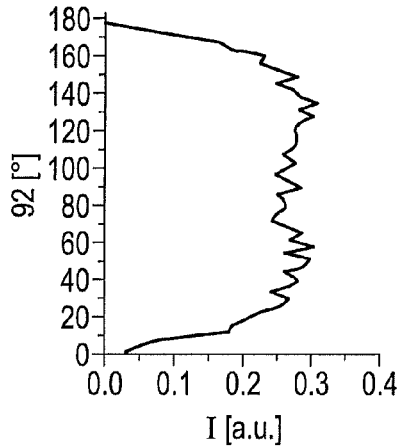
B)
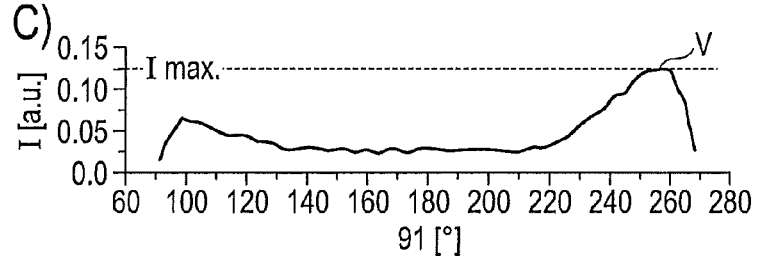
C)

FIG 10
A)
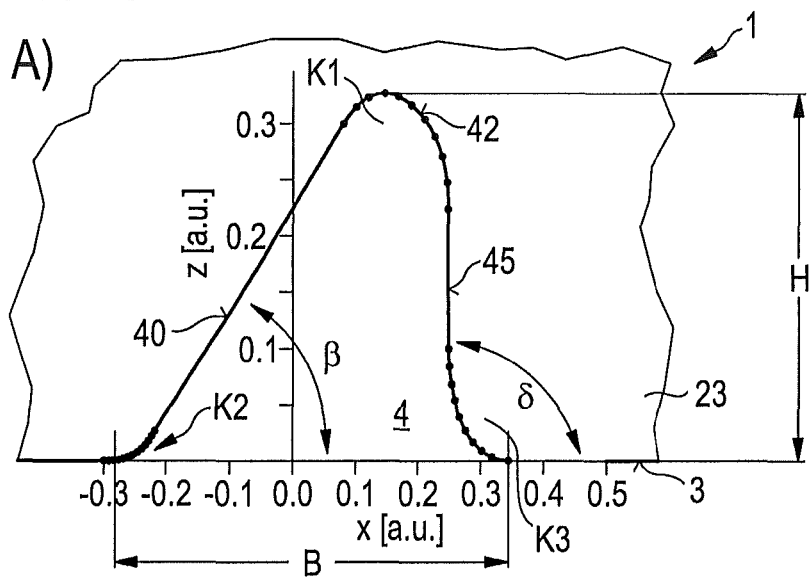
B)
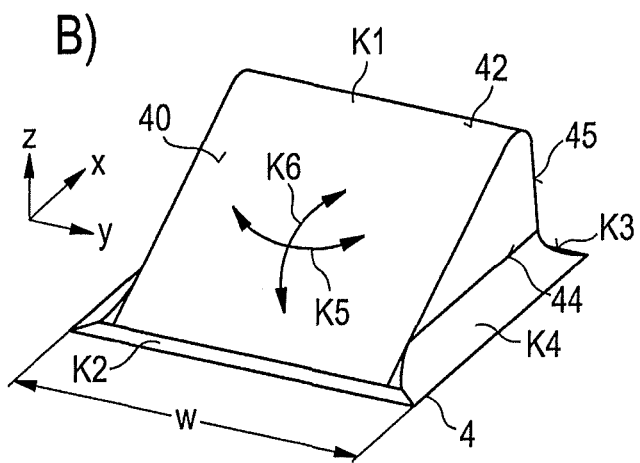
FIG 11
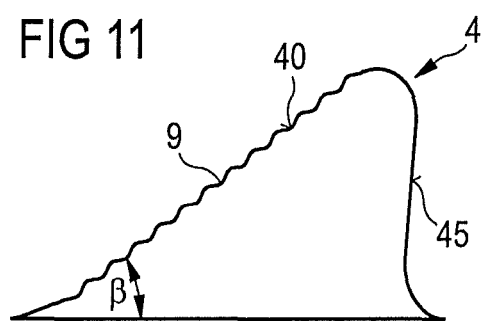

FIG 12
A) 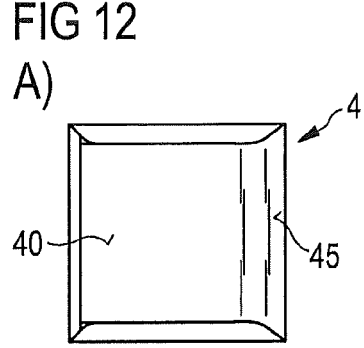
B) 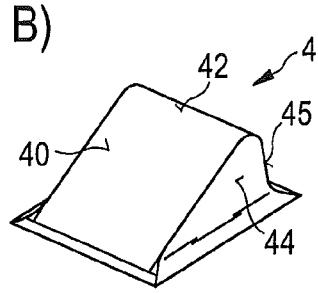
C) 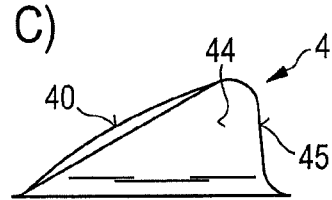
D) 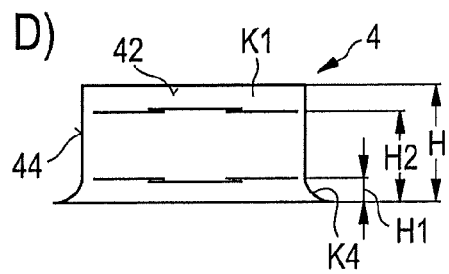
FIG 13
A) 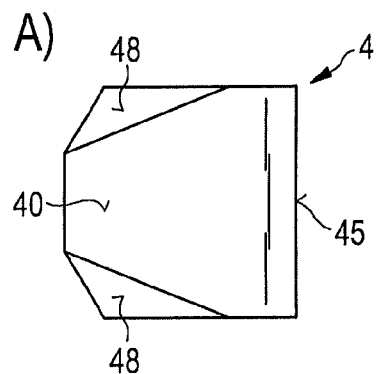
B) 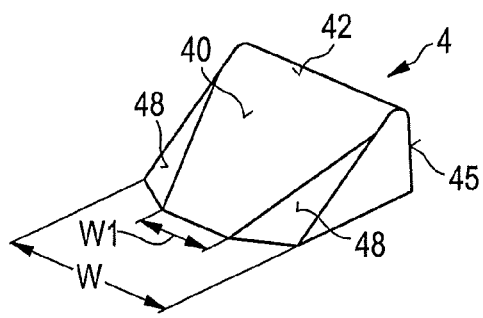
C) 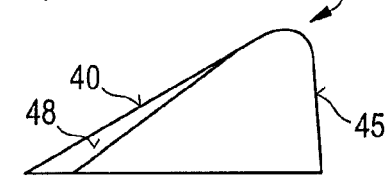
D) 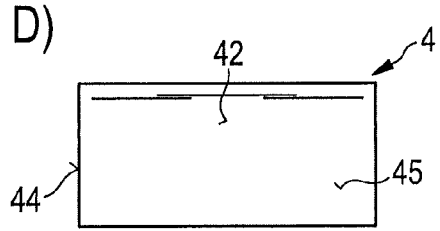

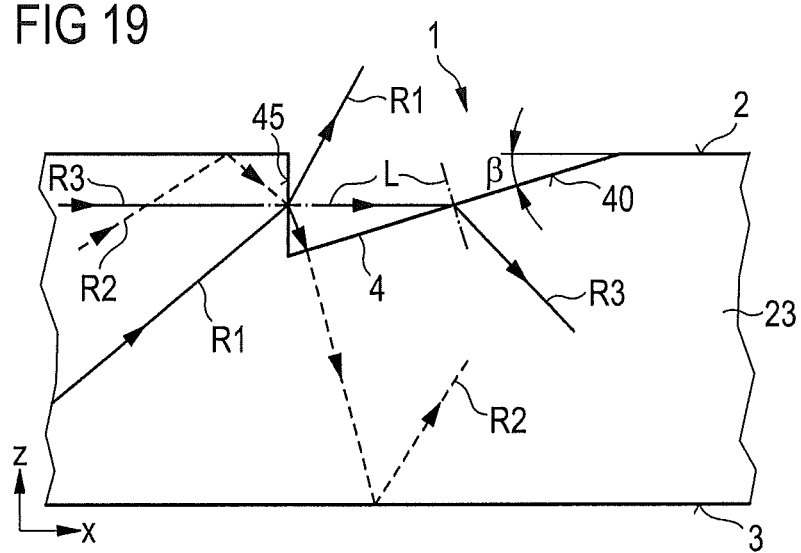
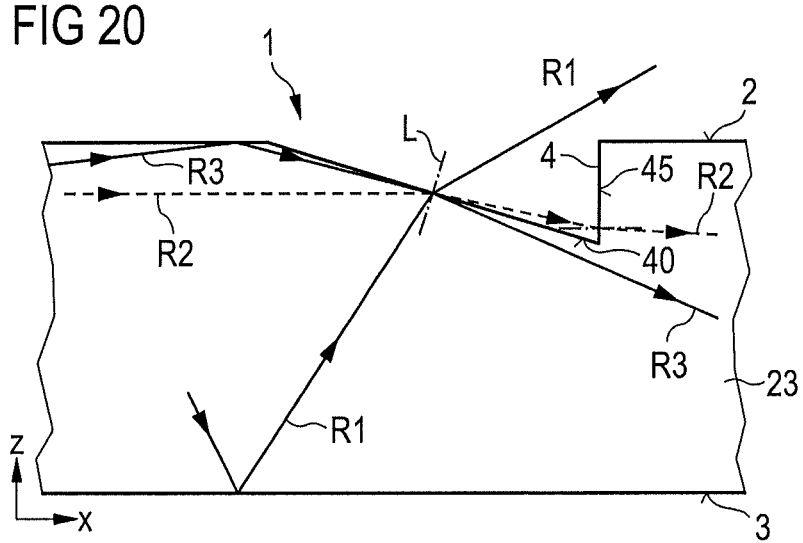

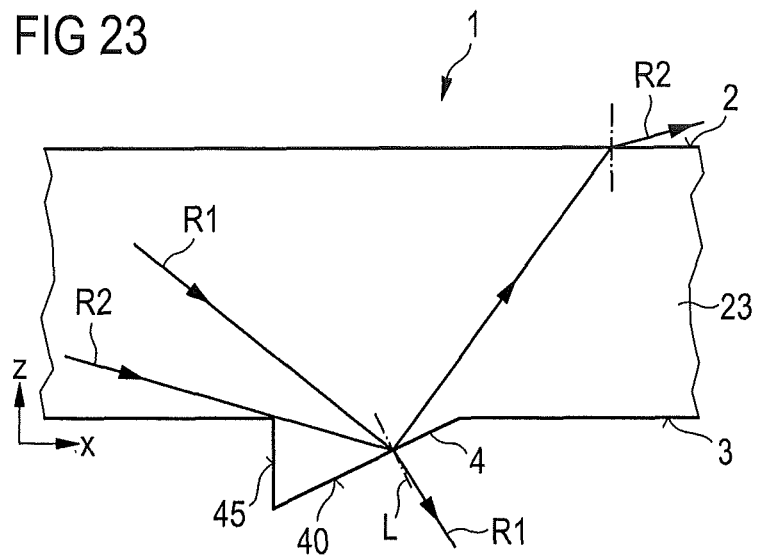
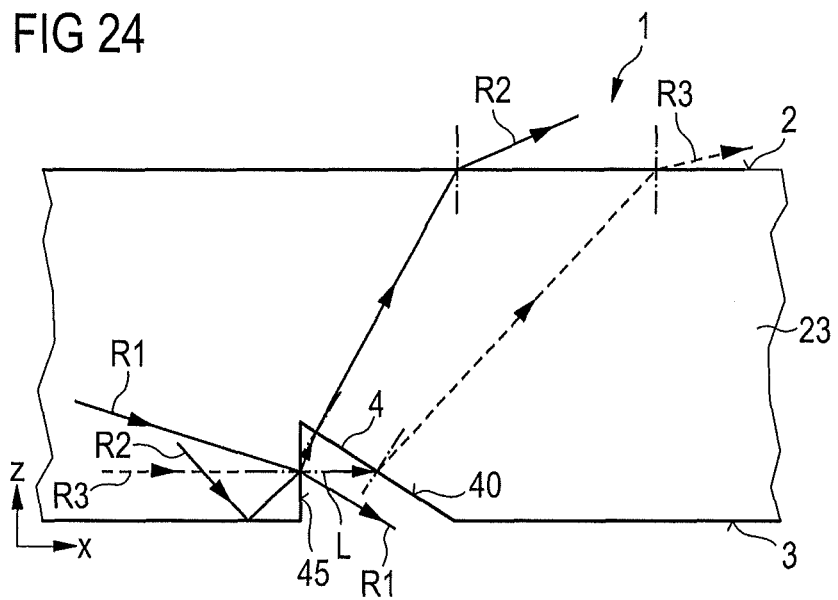

US 8,936,384 B2

PLANAR LIGHT GUIDE AND LIGHTING DEVICE

RELATED APPLICATIONS

This is a §371 of International Application No. PCT/EP2011/054231, with an international filing date of Mar. 21, 2011 (WO 2011/138086 A1, published Nov. 10, 2011), which is based on German Patent Application No. 10 2010 019 051.9, filed May 3, 2010, the subject matter of which is incorporated herein by reference.

TECHNICAL FIELD

This disclosure relates to a planar light guide and a lighting device comprising such a planar light guide.

BACKGROUND

There is a need for a planar light guide having a predeterminable, asymmetric emission characteristic.

SUMMARY

We provide a planar light guide including a main body with a back face and a radiation outcoupling face opposite thereto, a main direction of light guidance parallel to the radiation outcoupling face, at least one plurality of identically shaped and identically oriented outcoupling structures formed on at least one of the main faces, and at least one structure main face per outcoupling structure, wherein an angle-dependent emission characteristic is provided asymmetrically in a first plane parallel to the main direction of light guidance and perpendicular to the radiation outcoupling face.

We also provide a planar light guide including a main body with a back face and a radiation outcoupling face opposite thereto, a main direction of light guidance parallel to the radiation outcoupling face, at least one plurality of identically shaped and identically oriented outcoupling structures formed on at least one of the main faces, and at least one structure main face per outcoupling structure, wherein an angle-dependent emission characteristic is provided asymmetrically in a first plane parallel to the main direction of light guidance and perpendicular to the radiation outcoupling face, and wherein one of two alternatives applies: 1) a face of the outcoupling structures which precedes along the main direction of light guidance the structure main face is oriented perpendicular to the main direction of light guidance, the outcoupling structures are formed by recesses on the back face and $\alpha-6°<\beta<93°-\alpha$ and/or $\alpha+3°>\beta>86°-\alpha$ applies, wherein $\alpha$ is an angle of total reflection determined by a material of the main body and $\beta$ is an average angle between the structure main face and the back face, or 2) the structure main face is oriented parallel to a structure back face opposite the structure main face.

BRIEF DESCRIPTION OF THE DRAWINGS

FIGS. 1 to 6 show schematic diagrams of examples of lighting devices.

FIG. 7 shows a schematic representation of an emission characteristic of a lighting device.

FIGS. 8, 9 and 27 show schematic diagrams of modifications of a lighting device.

FIGS. 10 to 16 show schematic diagrams of examples of outcoupling structures for planar light guides.

FIGS. 17 to 26 show schematic diagrams of examples of planar light guides.

DETAILED DESCRIPTION

Figure 4:
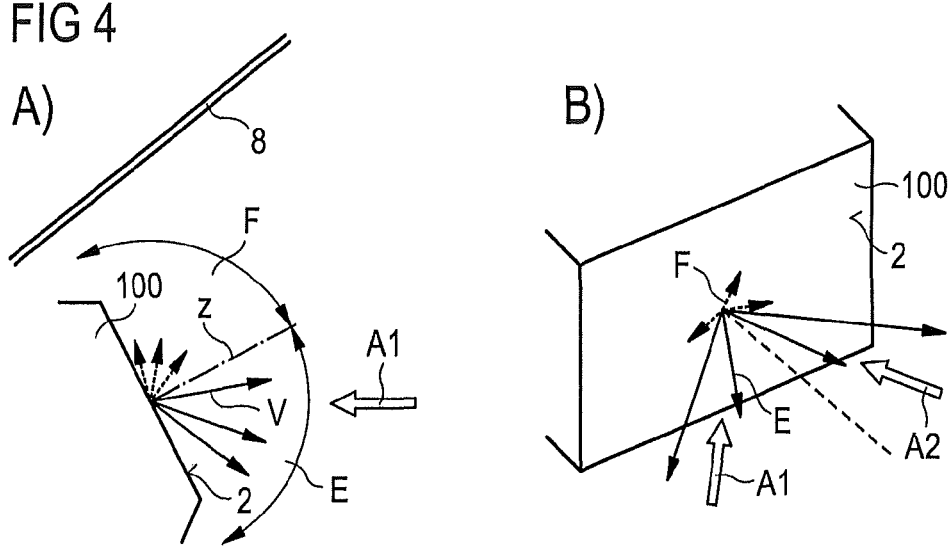

Our planar light guide may comprise a main body, in particular exactly one main body. The main body is of planar construction and comprises a back face and, on the opposite side thereto, a radiation outcoupling face. The back face and the radiation outcoupling face are the main faces of the main body and may be oriented parallel to one another. "Radiation outcoupling face" means that light outcoupling, in particular deliberate light outcoupling, proceeds exclusively or predominantly at this main face. "Predominantly" means, for example, at least 50% or at least 80% or at least 95%. At least 10% or at least 20% or at least 50% of the radiation guided in or coupled into the planar light guide leaves the main body via the radiation outcoupling face. The main body is transparent to radiation which is to be guided in the planar light guide. The main body is furthermore preferably designed to guide radiation to be guided in the planar light guide by way of total reflection, in particular exclusively by way of total reflection.

The planar light guide may comprise at least one main direction of light guidance. The main direction of light guidance is preferably oriented parallel to the radiation outcoupling face. The planar light guide in particular comprises exactly one main direction of light guidance. The main direction of light guidance is a direction in which the planar light guide is designed to guide radiation.

The planar light guide may comprise at least one or precisely one plurality of identically shaped outcoupling structures. The outcoupling structures are preferably designed to deflect radiation guided in the planar light guide by reflection, total reflection and/or refraction such that the radiation may be emitted immediately thereafter from the planar light guide, in particular at the radiation outcoupling face. This means that the outcoupling structures are designed to modify an angle of radiation transiting the planar light guide relative, for example, to the radiation outcoupling face such that directly on and/or after reflection and/or refraction of the radiation at the outcoupling structures the angle falls below an angle of total reflection at the radiation outcoupling face.

The planar light guide may comprise at least two outcoupling structures which are differently shaped and/or differently oriented to one another, a plurality of which outcoupling structures are in each case present. For example, a first plurality of outcoupling structures in an edge zone are arranged in a rotated manner relative to a second plurality of outcoupling structures in a central zone of the main body, in particular to achieve more uniform illumination of the radiation outcoupling face at an edge. "Edge zone" means, for example, a strip of a width of 10% of a maximum extent of the radiation outcoupling face in the corresponding direction. It is likewise possible for outcoupling structures of a first and a second plurality to be arranged alternately.

The outcoupling structures in each case may comprise at least one, in particular precisely one structure main face. The structure main face is a boundary face of the outcoupling structures designed to deflect radiation impinging on the outcoupling structure such that, after impinging on the radiation outcoupling face, the radiation may be emitted from the main body. Light outcoupling from the main body may also proceed directly at the structure main faces should the latter be part of the radiation outcoupling face. The structure main face may be planar or also curved in shape.

The outcoupling structures of the plurality may be identically oriented. In other words, the outcoupling structures of the plurality may then be made congruent with one another exclusively by a translational shift. The outcoupling structures are furthermore located on at least one, preferably on precisely just one of the main faces, thus either on the back face or on the radiation outcoupling face. The outcoupling structures are, for example, in a regular and/or predetermined arrangement thus, for example, not in a chance or random distribution.

An angle-dependent emission characteristic may be provided asymmetrically in a first plane parallel to the main direction of light guidance and perpendicular to the radiation outcoupling face. In other words, in the first plane there is no mirror line, relative to which the emission characteristic is mirror-symmetrical.

The planar light guide may be designed such that, in the first plane, a maximum light intensity is emitted in one direction, this direction lying, for example, in an angular range of −30° to +60° or 10° to +30°. It is alternatively or additionally possible for no or substantially no radiation to be emitted in a specific, contiguous angular range of, for example, at least 15° or at least 25° and/or at most 60° or at most 40°, or for the entirety or substantially the entirety of the radiation which is to be emitted in the angular range. An angle of the direction of maximum light intensity is here relative to a perpendicular angle to the radiation outcoupling face. Away from the perpendicular angle in the direction of the main direction of light guidance, the angle is positive, while away from the perpendicular angle contrary to the main direction of light guidance, it is negative, in each case in the first plane.

The planar light guide may comprise a main body with two main faces, namely a back face and a radiation outcoupling face opposite thereto. The planar light guide furthermore comprises a main direction of light guidance oriented parallel to the radiation outcoupling face. The planar light guide contains at least one plurality of identically shaped and identically oriented outcoupling structures provided on at least one or precisely one of the main faces. The outcoupling structures furthermore each comprise at least one structure main face.

The main body may have an angle of total reflection $\alpha$ which is predetermined by a material of the main body. If the main body is surrounded by air with a refractive index of 1, the angle of total reflection $\alpha$ is obtained as the arcsine of the reciprocal refractive index of the main body.

The angle-dependent emission characteristic of the planar light guide may be that of a Lambertian emitter, in a second plane perpendicular to the main direction of light guidance and perpendicular to the radiation outcoupling face. The emission characteristic corresponds to that of a Lambertian emitter in particular with a tolerance of at most 25% of the maximum light intensity, preferably with a tolerance of at most 15% or of at most 10%. A Lambertian emitter means that the angle-dependent light intensity is proportional to the cosine of an emission angle, relative to the perpendicular of the radiation outcoupling face.

The structure main face of the outcoupling structures may be designed to deflect a fraction of the radiation guided in the planar light guide by total reflection. The totally reflected fraction of the radiation here entirely or partially comprises an angle relative to the radiation outcoupling face such that, after total reflection at the structure main face, the fraction of the radiation entirely or partially passes through the radiation outcoupling face and is outcouplable.

The direction in which the planar light guide emits the maximum light intensity when in operation may be predetermined by an angle $\beta$ between the structure main face and the back face of the main body. In this case, only or predominantly only those fractions of the radiation may in particular be emitted from the planar light guide which undergo a change of direction by total reflection at the structure main face. This means that it is predominantly only or only those fractions of the radiation which impinge on the structure main face of the outcoupling structures at an angle of incidence greater than the angle of total reflection which are coupled out of the planar light guide.

The average angle $\beta$ between the structure main face and the back face may obey the following relationship: $0 \leq \sin|\alpha-\beta| \leq 0.6$. In particular, $\sin|\alpha-\beta|$ is 0 to 0.4, preferably 0 to 0.3 or 0 to 0.2.

The outcoupling structures may be formed by recesses on one of the main faces, in particular exclusively on the back face. The outcoupling structures furthermore each comprise precisely one structure main face, the structure main face facing a radiation entrance face of the main body. In other words, the boundary face of the outcoupling structures facing the radiation entrance face, in particular the structure main face, is then oriented obliquely to the back face and obliquely to the radiation outcoupling face of the main body.

The planar light guide may comprise precisely one radiation entrance face. The radiation entrance face is a face of the main body designed such that radiation is coupled into the planar light guide via the radiation entrance face.

The outcoupling structures may be formed by raised portions or projections on at least one or precisely one of the main faces. In other words, the outcoupling structures then project out from the corresponding main face.

One of both of the following relationships may apply:

$$\alpha - 6° < \beta < 93 - \alpha, \alpha + 3° > \beta > 86° - \alpha.$$

The angle of total reflection $\alpha$ of the main body may be 35° to 50°, in particular 40° to 45°. It is furthermore the case that the average angle $\beta$ between the structure main face and the back face of the main body is equal to the angle of total reflection $\alpha$, for example, with a tolerance of at most 10°, more preferably of at most 5°, in particular of at most 2° or of at most 0.5°.

The outcoupling structures may have a face located before the structure main face along the main direction of light guidance (x). This face is oriented with a tolerance of at most 10° or of at most 5°, perpendicular to the main direction of light guidance.

The outcoupling structures may comprise a structure back face on the opposite side to the structure main face. The structure back face is here a main face of the outcoupling structures. In particular, the structure back face faces away from the radiation entrance face of the main body. For example, the emission characteristic of the planar light guide in the first plane is not or predominantly not adjusted by the structure back face.

The structure back face may be planar or substantially planar. The structure back face is furthermore not designed to deflect radiation guided in the planar light guide such that the radiation is outcouplable from the main body directly after reflection, total reflection and/or refraction at the structure back face. The structure back face is thus not designed to deflect the radiation guided in the planar light guide such that the radiation may leave the planar light guide at the radiation outcoupling face. This does not exclude negligible fractions of the radiation from possibly undergoing such deflection at the structure back face and then being coupled out.

The structure main face may be oriented, with a tolerance of at most 10° or of at most 5°, parallel to the structure main face.

The structure main faces of the outcoupling structures may be designed to transmit radiation guided in the planar light guide which impinges on the structure main face at angles of incidence of less than the angle of total reflection α. These transmitted fractions of the radiation pass through the structure main face and leave the main body of the planar light guide. The structure back faces of the outcoupling structures are furthermore designed such that at least some of the radiation transmitted through the structure main face also passes through the structure back faces. The fraction of the radiation passing through the structure back faces passes back into the main body.

The structure main faces of the outcoupling structures may be connected along the main direction of light guidance, with the structure back face of the outcoupling structures via a rounded portion or via a plurality of rounded portions. The rounded portion is part of a boundary face of the outcoupling structures and preferably comprises an average curvature of 5 $mm^{-1}$ to 100 $mm^{-1}$, in particular 10 $mm^{-1}$ to 65 $mm^{-1}$.

The structure main face of the outcoupling structures may be curved along the main direction of light guidance and/or in a direction perpendicular to the main direction of light guidance. An average curvature of the structure main face preferably amounts to at most 1 $mm^{-1}$, in particular at most 0.5 $mm^{-1}$ or at most 0.25 $mm^{-1}$.

The outcoupling structures may be of a sawtooth or slot shape, viewed in a cross-section parallel to the first plane. "Slot-shaped" means that an extent of the outcoupling structures along the main direction of light guidance is smaller than an extent of the outcoupling structures crosswise to one of the main faces. "Sawtooth-shaped" means that the outcoupling structures are triangular in shape, in particular in a manner of a right-angle triangle, in a cross-section parallel to the main direction of light guidance, it being possible for corners to be rounded, for example, as a result of the manufacturing method.

The outcoupling structures may have a triangular, a rectangular or a square base area. The base area is in particular that area occupied by the outcoupling structures on the back face or on the radiation outcoupling face. Rectangular or square does not exclude the base area of the outcoupling structures having rounded corners.

The outcoupling structures may occupy a fraction of one of the main faces of 20% to 70%, in particular 25% to 60%.

The structure main faces of the outcoupling structures may be provided with roughening. The roughening is preferably designed to reflect diffusely or totally at least some of the radiation reflected at the structure main faces. The roughening particularly preferably only gives rise to small-angle scattering of the reflected or totally reflected radiation such that the angle-dependent emission characteristic, which is determined by the average angle β of the structure main face to the back face, is unaffected or not significantly affected by the roughening. In particular, the direction in which maximum light intensity is emitted is unaffected or not substantially affected by the roughening.

The structure main faces of the outcoupling structures laterally, thus in particular in a plane parallel to the radiation outcoupling face, completely or in part may adjoin at least one chamfer, preferably two chamfers. A chamfer is a preferably planar boundary face of the outcoupling structures, oriented obliquely to the structure main face. An angle between a perpendicular of the at least one chamfer and a perpendicular of the structure main face is, for example, 20° to 70°, in particular 30° to 60° or around approx. 45°.

The structure main faces each have an area of 0.07 $mm^2$ to 2.0 $mm^2$, in particular 0.15 $mm^2$ to 1.5 $mm^2$ or 0.2 $mm^2$ to 0.8 $mm^2$. The structure main faces are thus comparatively large.

The outcoupling structures may act exclusively or predominantly on the basis of geometric optics. In other words, a viewpoint exclusively based on geometric optics approximately represents the emission characteristic of the planar light guide such that wave-optical aspects may be disregarded.

The thickness of the main body may be 1 mm to 20 mm, preferably 1.5 mm to 8 mm.

The density of the outcoupling structures may increase in the main direction of light guidance. In particular, the number n of outcoupling structures per unit length obeys the following relationship, with a tolerance of at most 40% or of at most 20% or of at most 10% of the maximum number of outcoupling structures per unit area of the planar light guide: $n(x) = n_0/(1-n_0 x)$. x is the main direction of light guidance and $n_0$ is the number of outcoupling structures per unit length on the radiation entrance face.

The planar light guide may comprise a mirror. The mirror is in particular applied on the back face of the main body. The mirror may be a specularly or diffusely reflecting mirror.

A lighting device is furthermore indicated which comprises a planar light guide as stated in connection with at least one of the above described examples. Features of the lighting device are therefore also disclosed for the planar light guide and vice versa.

The lighting device may comprise at least one electrically operable light source. The light source is mounted on at least one, in particular precisely one radiation entrance face of the main body of the planar light guide. The light source in particular comprises light-emitting diodes, for example, light-emitting diodes arranged in a strip, fluorescent tubes (cold cathode fluorescent lamps (CCFL)), and/or linearly emitting light sources. The lighting device furthermore comprises at least one, in particular precisely one planar light guide.

The lighting device may comprise a diffuser preferably mounted on the radiation outcoupling face. The diffuser is designed to modify the emission characteristic of the planar light guide by at most 20% or by at most 10% of the maximum light intensity. In other words, the diffuser does not substantially modify the emission characteristic of the planar light guide, in particular the diffuser does not or does not significantly modify the direction along which the maximum light intensity is emitted, for example, by at most 20° or by at most 10° or by at most 5°.

The lighting device may not comprise diaphragms or shading films. In other words, the angle-dependent emission characteristic of the radiation generated by the light sources when in operation which is guided and emitted by the planar light guide is not adjusted by diaphragms or shading films. The emission characteristic is then preferably exclusively or predominantly predetermined by the outcoupling structures of the planar light guide.

The lighting devices described herein may, for example, be used in general lighting applications. The described lighting devices or planar light guides described herein may furthermore be used for backlighting display units.

A planar light guide described herein and a lighting device described herein are explained in greater detail below with reference to examples and the associated figures. Elements which are the same in the individual figures are indicated with the same reference numerals. The relationships between the elements are not shown to scale, however, but rather individual elements, in particular angles, may be shown exaggeratedly large to assist in understanding.

FIG. 1 illustrates an example of a lighting device 100 with a planar light guide 1 in a schematic side view. A light source 6, for example, one or more light-emitting diodes, is mounted on a radiation entrance face 5 of a main body 23 of the planar light guide 1. The light source 6 may, other than shown in the drawing, be mounted directly on the radiation entrance face 5 of the main body 23 or, as shown in FIG. 1, be arranged at a distance from the radiation entrance face 5.

The planar main body 23 comprises a back face 3 and a radiation outcoupling face 2 which form the main faces of the main body 23 and are opposite one another. The radiation outcoupling face 2 is the main face of the planar light guide 1, which face is designed to emit radiation guided in the planar light guide 1. Radiation is predominantly emitted at the radiation outcoupling face 2.

Outcoupling structures 4 in the form of recesses which are, for example, filled with air, are formed on the back face 3 of the main body 23. The outcoupling structures 4 comprise a structure main face 40 facing the light source 6. The structure main faces 40 form an average angle $\beta$ with the back face 3. A structure back face 45 faces away from the light source 6. The density of the outcoupling structures 4 per unit length preferably increases continuously along a main direction of light guidance x away from the light source 6. A distance between two adjacent outcoupling structures 4 along the main direction of light guidance x is preferably selected such that fractions of radiation deflected at the radiation outcoupling face 2 by adjacent outcoupling structures 4 are in contact or overlap, so ensuring uniform illumination of the radiation outcoupling face 2.

A diffuser 7, for example, a scattering film is optionally mounted on the radiation outcoupling face 2. Such a diffuser 7 may also be used in conjunction with any of the other examples. The diffuser homogenizes the radiation emitted from the planar light guide 1. In particular, thanks to the diffuser, on observation in plan view onto the radiation outcoupling face 7, individual ones of the outcoupling structures 4 cannot be distinguished or can only be distinguished with difficulty with the naked human eye. The diffuser 7 does not affect or only negligibly affects the angle-dependent emission characteristic, determined by the outcoupling structures, of the planar light guide 1.

FIG. 2 shows a further example in a side view, the illustration focusing on the path of a ray R at one of the outcoupling structures 4 such that only one of the outcoupling structures 4 is shown. The structure main face 40 is of approximately planar construction, as is the structure back face 45. An angle $\delta$ between the back face 3 and the structure back face 45 is 75° to 105°, in particular approximately 90°.

An extent B of the outcoupling structure 4 along the main direction of light guidance x is preferably 0.2 mm to 1 mm, in particular 0.3 mm to 0.7 mm. A height H of the outcoupling structure 4 amounts, for example, to 0.1 mm to 0.6 mm, in particular 0.2 mm to 0.4 mm. A thickness T of the main body 23 amounts, for example, to 1 mm to 20 mm, in particular 2 mm to 6 mm. Viewed in plan view onto the radiation outcoupling face 2, the extent of the main body 23 along the main direction of light guidance x in particular amounts to 1 cm to 20 cm, for example, around 4 cm, and, in a direction perpendicular to the main direction of light guidance x, in particular to 4 cm to 40 cm, for example, around 12 cm. The extent of the planar light guide along the main direction of light guidance x preferably amounts to at least 10 times, in particular at least 15 times or 20 times the thickness T of the main body 23. All the other examples may likewise have the stated dimensions.

The ray R has an angle of incidence $\epsilon$ to a perpendicular L of the structure main face 40 which is slightly larger than the angle of total reflection $\alpha$ of the main body 23, in particular relative to air. In other words, the ray R is totally reflected at the structure main face 40, which constitutes a boundary surface of a material of the main body 23 to the air in the outcoupling structure 4. The ray R reflected at the structure main face 40 impinges on the radiation outcoupling face 2 at an angle $\gamma$ to a perpendicular z thereto. The angle $\gamma$ is less than the angle of total reflection $\alpha$, such that the ray R leaves the main body 23 at an emission angle $\tau$.

Accordingly, the only rays R to be reflected on the structure main face 40 are those having an angle of incidence $\epsilon$ to the perpendicular L of the structure main face 40 which is greater than or equal to the angle of total reflection $\alpha$. A desired emission range E may thus be predetermined by the angle $\beta$ between the structure main face 40 and the back face 3. In particular, the angle $\beta$ determines the minimum and maximum emission angle $\tau$ at which the radiation leaves the main body 23.

If the angle of incidence $\epsilon$ of the ray R is equal to the angle of total reflection $\alpha$, the relation $\gamma=\alpha-\beta$ applies. The following relation applies for the emission angle $\tau$: $\sin \tau = n \sin \gamma = n \sin(\alpha-\beta)$. n is the refractive index of the main body 23. $\tau > 0$ means that the ray R with a component along the main direction of light guidance x is emitted at the radiation outcoupling face 2, an emission angle of $\tau < 0$ means that the ray R comprises a component contrary to the main direction of light guidance x, cf. FIG. 3C.

FIG. 3 explains the mode of action of the outcoupling structures 4 with reference to further examples. FIG. 3A shows that the planar light guide 1 only guides those rays R which impinge on the main faces 2, 3 of the main body 23 at angles greater than the angle of total reflection $\alpha$. Only rays R with angles in two angular ranges i, ii are guided into the main body 23. Therefore, as an approximation, only those rays R which fall within the angular ranges i, ii impinge on the structure main face 40.

Three rays R1, R2, R3 are drawn in FIG. 3B. The course of ray R2 is approximately parallel to the back face 3. Ray R1 should be assigned to angular range ii, while ray R3 should be assigned to angular range i. At the comparatively small angle $\beta$ according to FIG. 3, only ray R2 is emitted at the radiation outcoupling face 2. The ray R3 is totally reflected both at the structure main face 40 and at the radiation outcoupling face 2. The ray R1 passes through both the radiation outcoupling face 40 and the structure back face 45 and likewise remains in the main body 23.

In FIG. 3C, the angle $\beta$ of the outcoupling structure 4 is comparatively large. Ray R1, which should be assigned to angular range ii, is guided in a similar manner to ray R1 from FIG. 3B. Ray R2, which impinges on the structure main face 40 approximately parallel to the back face 3, is guided through the outcoupling structure 4 and not coupled out. Only ray R3 is totally reflected at the structure main face 40 and then emitted at the radiation outcoupling face 2, wherein $\tau < 0$.

As a consequence, rays R of angular range i, cf. FIG. 3A, in part pass through the structure main face 40 and the structure back face 45 when $\beta \geq 90°-\alpha$. Where $\beta > 90°-\alpha$, rays R of angular range i undergo complete total reflection at the structure main face 40. If $\beta < \alpha$, rays R of angular range i may be totally reflected at the radiation outcoupling face 2.

In the case of rays R of angular range ii as seen in FIG. 3A, the smaller is the angle $\beta$, the larger is the fraction of radiation which is totally reflected at the structure main face 40. If $\alpha+\beta > 90°$, rays R of angular range ii no longer undergo total reflection at the outcoupling structure 4. If high radiation outcoupling efficiency from the main body 23 is to be achieved, $\beta < 90°-\alpha$ or $\beta < \alpha$ preferably applies. $\beta$ is preferably between $\alpha$ and $90°-\alpha$. In particular, $\beta$ is equal to $\alpha$. Due to side effects such as, for example, Fresnel reflection, the stated relationships in particular apply with a tolerance of at most 6° or of at most 3° or of at most 1°, as indeed in all the other examples.

FIGS. 4 to 7 show the emission characteristic I of a further example of the lighting device 100 in greater detail. The emission characteristic I is shown here without a diffuser. According to the schematic side view of FIG. 4A, the lighting device 100 is used as a display, for example, for a car radio. In the desired emission range E, the radiation emitted by the display, in particular from a viewing direction A1, for example, of the driver is readily visible. In an undesired emission range F, as little as possible or distinctly less radiation is emitted than in the desired emission range E, to avoid or reduce reflection or glare through the window 8.

The emission characteristic I in a first plane, defined by the perpendicular z and the main direction of light guidance x, is shown in greater detail in FIG. 6. Along an angle ρ1 in the first plane, the emission characteristic I exhibits a maximum light intensity $I_{max}$ at approx. 190° as seen in FIG. 7C. A direction V of maximum emission intensity is thus at an angle of approx. 190°, approximately perpendicular to the radiation outcoupling face 2. Along the first plane, only a small fraction of the radiation is emitted in the undesired emission range F. This is seen also in the two-dimensional, angle-dependent representation of the emission characteristic I according to FIG. 7A. Average luminance amounts, for example, to at least 25 cd/m² or at least 250 cd/m².

Along a second plane parallel to the radiation outcoupling face 2 and perpendicular to the main direction of light guidance x, emission is desired over a wide angular range, such that the information on the display with the lighting device 100 is visible not only to the driver from a viewing direction A1 but also to a passenger from a viewing direction A2. In this second plane, along an angle ρ2 as seen in particular in FIG. 7B, the emission characteristic I approximately corresponds to that of a Lambertian emitter.

Figure 5:
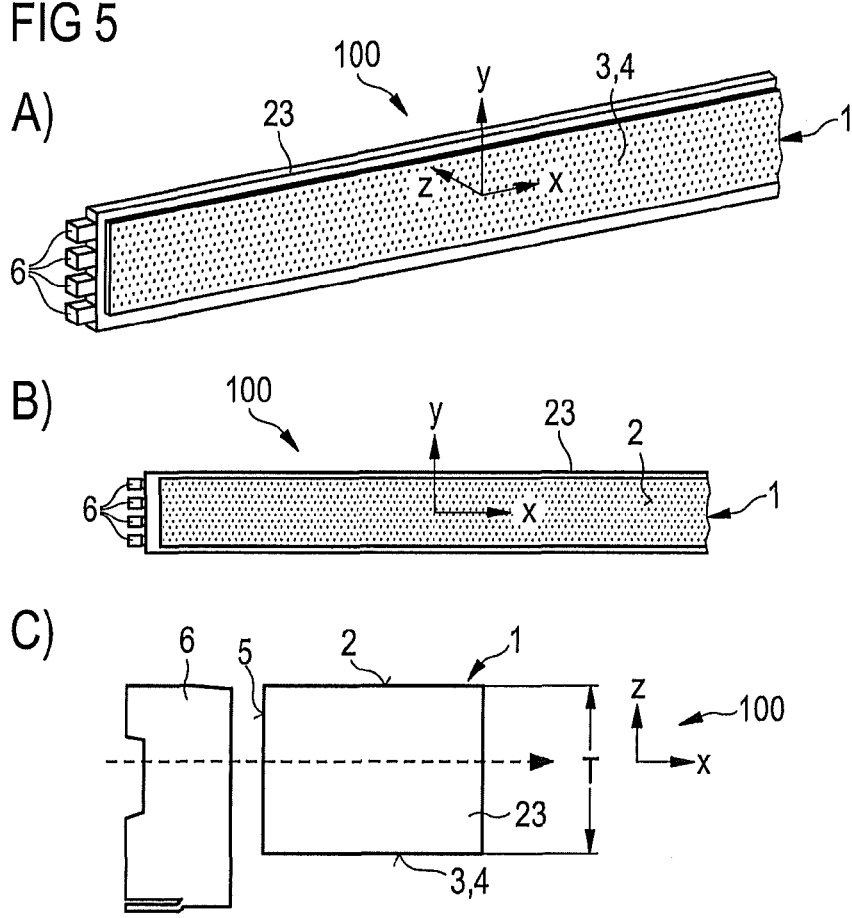

FIG. 5 shows such a lighting device 100 with a plurality of light-emitting diodes as light sources 6, for example, for a car radio display, in greater detail as seen in the three-dimensional representation according to FIG. 5A, the plan view according to FIG. 5B and the side view according to FIG. 5C.

FIG. 8 shows a conventional lighting device while FIG. 9 shows its emission characteristic I without a diffuser. Outcoupling elements 14 are ellipsoidal or spherical in shape and constructed as raised portions on the radiation outcoupling face 2 as seen in the schematic side view according to FIG. 8A, the detail view according to FIG. 8B and a three-dimensional plan view of the radiation outcoupling face 2 according to FIG. 8C.

The associated emission characteristic exhibits a maximum in the x-z plane at an angle ρ1 of approx. 250°. In other words, a major part of the radiation is emitted virtually parallel to the radiation outcoupling face 2, resulting in the radiation having a comparatively high glare effect on an observer. In the second plane, perpendicular to the main direction of light guidance x and to the radiation outcoupling face 2, the emission characteristic I has a plateau-like profile with a slightly pronounced minimum at ρ2=90° and differs significantly from that of a Lambertian emitter as seen in FIG. 9B.

FIG. 10 shows a further example of the planar light guide 1 with the outcoupling structure 4 in a schematic side view in FIG. 10A and in a three-dimensional representation in FIG. 10B. The structure main face 40 is joined with the structure back face 45 via a rounded portion 42. The rounded portion 42 exhibits a curvature K1. More uniform illumination of the radiation outcoupling face 2 may be achieved by means of such a rounded portion 42.

A transitional zone of the radiation outcoupling face 2 to the back face 3 and a transitional zone of the structure back face 45 to the back face 3 are furthermore rounded. These transitional zones exhibit curvatures K2, K3. Flanks 44, which constitute boundary faces of the outcoupling structures 4 in a direction perpendicular to the main direction of light guidance x, likewise comprise a curvature K4 in a transitional zone to the back face 3. The curvatures K1, K2, K3, K4 are preferably in the range of 5 mm⁻¹ to 100 mm⁻¹. The flanks 44 are oriented perpendicular to the back face 3, for example, with a tolerance of at most 5° or of at most 2°.

The structure main face 40 is optionally likewise concavely or convexly curved along the main direction of light guidance x with the curvature K6, or concavely or convexly curved in a y-direction perpendicular to the main direction of light guidance x with the curvature K5. Curvatures K5, K6 amount, for example, to at most 1 mm⁻¹.

The outcoupling structure 4 according to FIG. 11 comprises roughening 9 on the structure main face 40. The roughening 9 does not significantly modify the emission characteristic I of the outcoupling structure 4 brought about by the angle β. The roughening 9 comprises, for example, sub-surfaces which, in comparison with an average orientation of the structure main face 40, exhibit angles of in each case less than 5° or of in each case less than 2°. In other words, the roughening 9 preferably only causes small-angle scattering. The roughening 9 may, as indeed in all the examples, occur alternatively or additionally to the curvatures K5, K6.

The example according to FIG. 12, see the plan view in FIG. 12A, the side view in FIG. 12C, the rear view in FIG. 12D and the three-dimensional representation in FIG. 12B, comprises a structure main face 40 which is approximately planar in shape. The curvature K4 extends from a base area of the outcoupling structure 4 to a height H1. The structure back face H2, which extends to the rounded portion 42, reaches to a height H2. For example, the height H1 amounts to at most 20% or at most 10% of the height H of the entire outcoupling structure 4. The height H2 is, for example, 60% to 99%, in particular 75% to 90% of the height H.

In FIG. 13, the outcoupling structure 4 is provided with chamfers 48. The chamfers 48 are boundary faces of the outcoupling structure 4 oriented crosswise to the flanks 44 and crosswise to the structure main face 40. The chamfers 48 are, for example, formed by triangular faces or approximately triangular faces. Alternatively to what is shown, it is also possible for the chamfers 48 to extend as far as the rounded portion 42 such that the structure main face 40 then completely adjoins the chamfers 48 in the lateral direction.

A minimum width W1 of the structure main face 40 at the base area of the outcoupling structure 4 is, for example, 60% to 95% of a total width W of the outcoupling structure 4, in particular 70% to 90%. The total width W is, for example, 0.1 mm to 1.5 mm, in particular 0.3 mm to 0.75 mm, as indeed in all the other examples.

Figure 14:
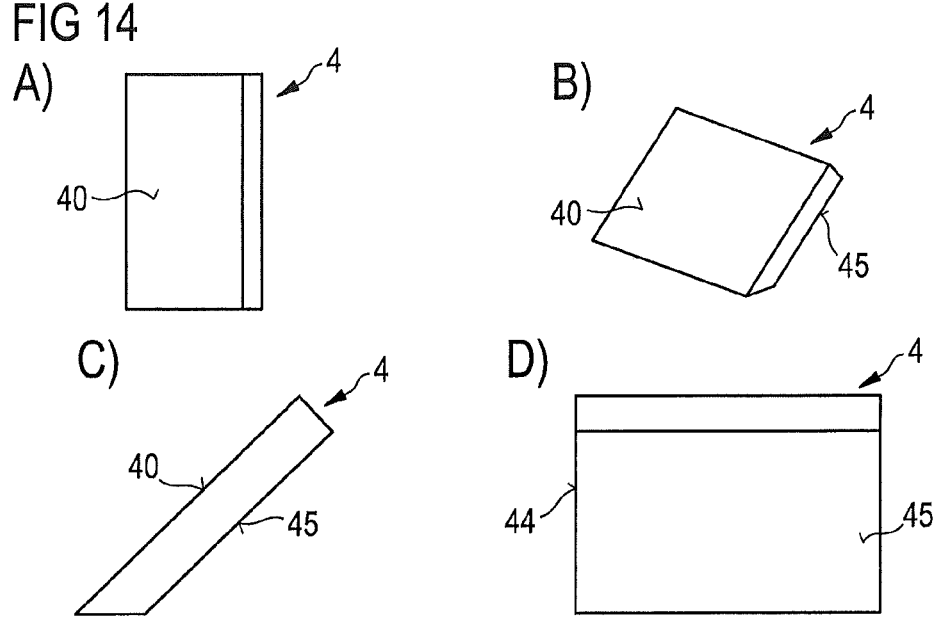

According to FIG. 14, the outcoupling structure 4 is of slot-shaped construction. The structure main face 40 and the structure back face 45 are oriented parallel to one another, for example, with a tolerance of at most 10°, of at most 5°, of at most 2° or of at most 0.5°.

Figure 15:
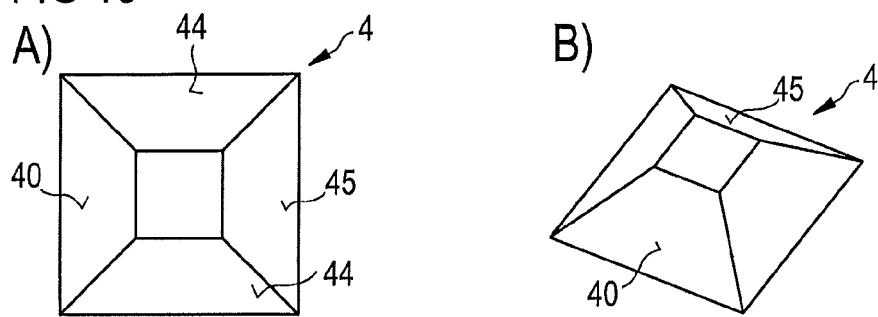
Figure 16:
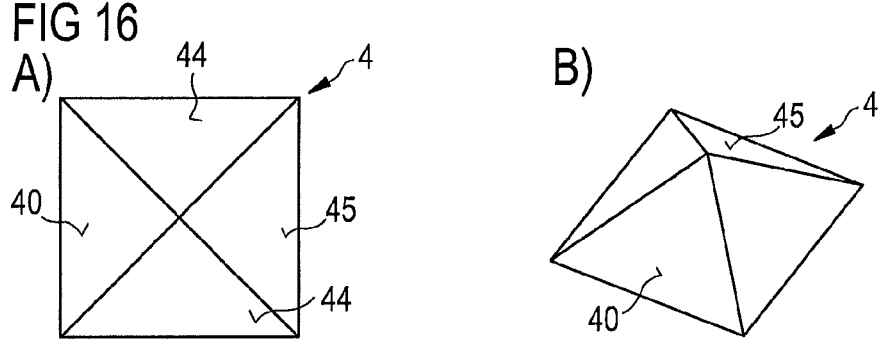

In the example of the outcoupling structure 4 according to FIG. 15, the latter is constructed as a truncated pyramid and has a square outline. According to FIG. 16, the outcoupling structure 4 is pyramidal in shape. Alternatively to what is shown, it is likewise possible for the outcoupling structure 4 also to be constructed as an irregular truncated pyramid or as an irregular pyramid. It is furthermore possible for the outcoupling structures 4 to have a triangular base area as an alternative to what is shown in FIGS. 14 and 16. In particular, a normal of the structure main face 40 facing the radiation entrance face 5 of the main body 2 is then in the first plane, parallel to the main direction of light guidance x and perpendicular to the radiation outcoupling face 2.

The geometric dimensions, as explained in connection with FIG. 2 and FIGS. 10 to 13 for outcoupling structures 4 which are sawtooth-like in cross-section, may be used in a similar manner for the outcoupling structures according to FIGS. 14 to 16.

FIGS. 17 to 26 show various ray paths in examples of the planar light guides 1 with the outcoupling structures 4. For simplicity's sake, only one outcoupling structure 4 is shown in each case and the outcoupling structures 4 are in each case sawtooth-like in cross-section. As an alternative to the diagrams in FIGS. 17 to 26, the outcoupling structures 4 may also in each case be constructed as is shown, for example, in FIGS. 10 to 16.

Figure 17:
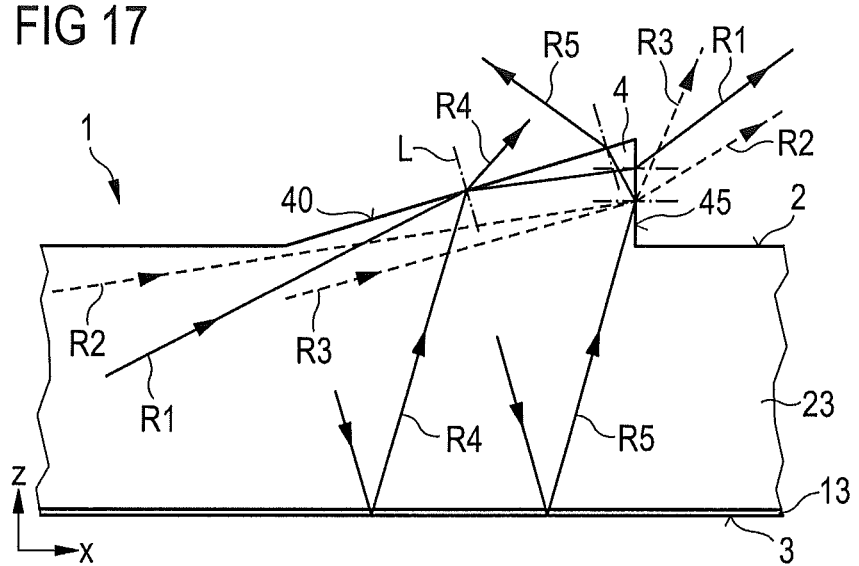

According to FIG. 17, the outcoupling structure 4 is constructed as a raised portion on the radiation outcoupling face 2. Radiation outcoupling proceeds both via the structure main face 40 and via the structure back face 45, an emission characteristic being critically determined by the structure main face 40. The structure main face 40 is located closer to a radiation entrance face, not shown in FIG. 17, of the main body 23 than the structure back face 45. An example ray R5 is totally reflected at the structure back face 45 and then emitted at the structure main face 40. Such rays R5 may give rise to emission in the undesired emission range F, cf. FIG. 6. Such rays R5 do, however, only constitute a small proportion of the entirety of the emitted radiation.

A mirror 13 is optionally applied over the entire surface or to sub-zones on one of the main faces 2, 3, in particular on the back face 3 of the main body 23. The mirror 13 preferably reflects specularly, i.e., in accordance with the law of reflection such that angles of incidence are equal to angles of emergence. Such a mirror 13 may optionally also be present in all the other examples.

Figure 18:
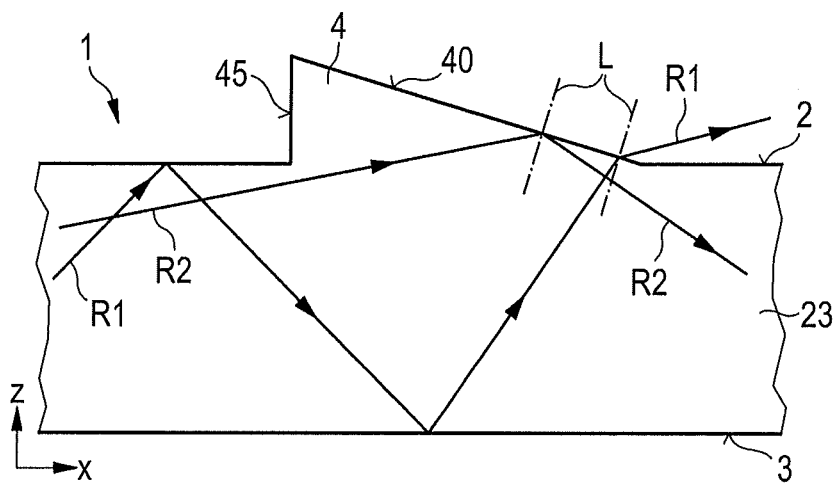

In the example according to FIG. 18, the structure back face 45 is closer to the radiation entrance face 5, not shown, than the structure main face 40. Approximately no or no significant fraction of the radiation leaves the planar light guide 1 via the structure back face 45. The emission characteristic is substantially exclusively adjusted by the structure main face 40.

According to FIGS. 19 to 22, the outcoupling structures 4 are formed by recesses in the radiation outcoupling face 2. According to FIG. 19, the structure back face 45 is oriented perpendicularly to the radiation outcoupling face 2 and faces the radiation entrance face 5, not shown. In this example too, the emission characteristic is predominantly determined by the structure main face 40 arranged at the angle β to the radiation outcoupling face 2. The area of the structure main face 40 is significantly greater than the area of the structure back face 45.

In the example according to FIG. 20, the structure main face 40 arranged transversely of the radiation outcoupling face 2 is closer to the radiation entrance face 5, not shown, than the structure back face 45, which is oriented approximately perpendicular to the radiation outcoupling face 2.

Figure 21:
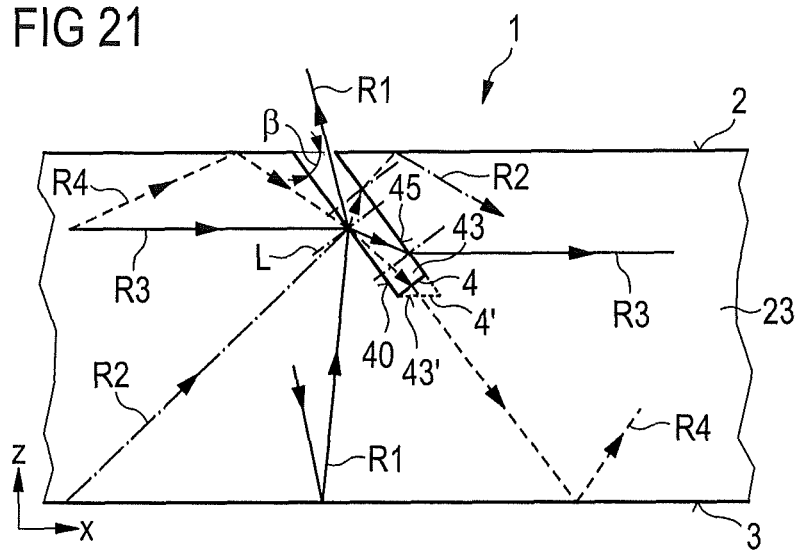
Figure 22:
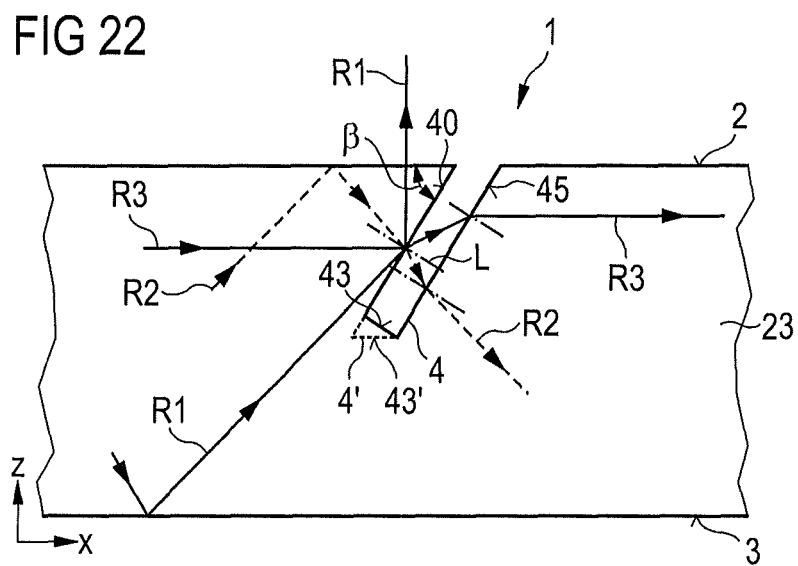

According to FIGS. 21 and 22, the outcoupling structures are slot-shaped. According to FIG. 21, the outcoupling structure 4 extends when viewed from the radiation outcoupling face 2 in the direction of the main direction of light guidance x. According to FIG. 22, the outcoupling structure 4 extends, starting from the radiation outcoupling face 2, contrary to the main direction of light guidance x. The structure back face 40 and the structure main face 45 are arranged approximately parallel to one another. In the outcoupling structures 4', a bottom face 43' is in each case oriented parallel to the radiation outcoupling face 2; according to the outcoupling structures 4, the bottom face 43 is oriented perpendicular to the structure main face 40.

In the example of the planar light guide 1 according to FIG. 23, the outcoupling structure 4 is constructed as a raised portion on the back face 3 of the main body 23. The emission characteristic is adjusted by the structure main face 40, which is further away from the radiation entrance face 5, not shown, than is the structure back face 45.

Figure 25:
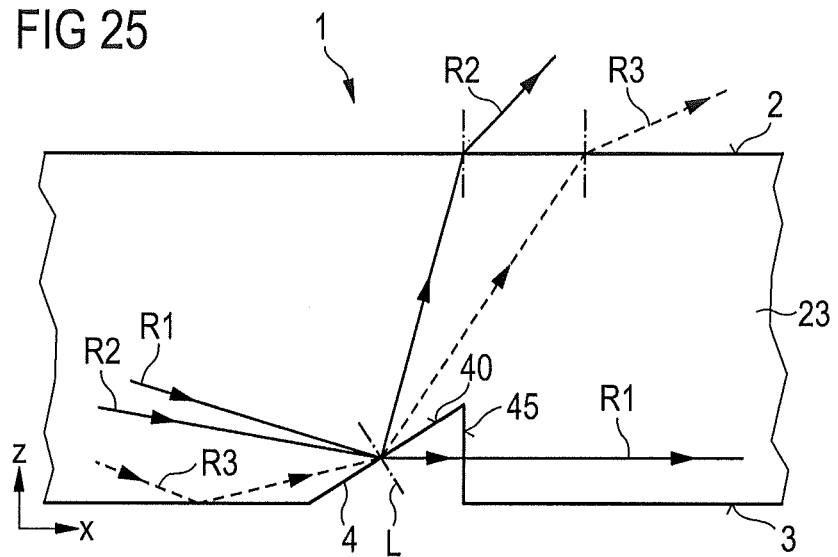
Figure 26:
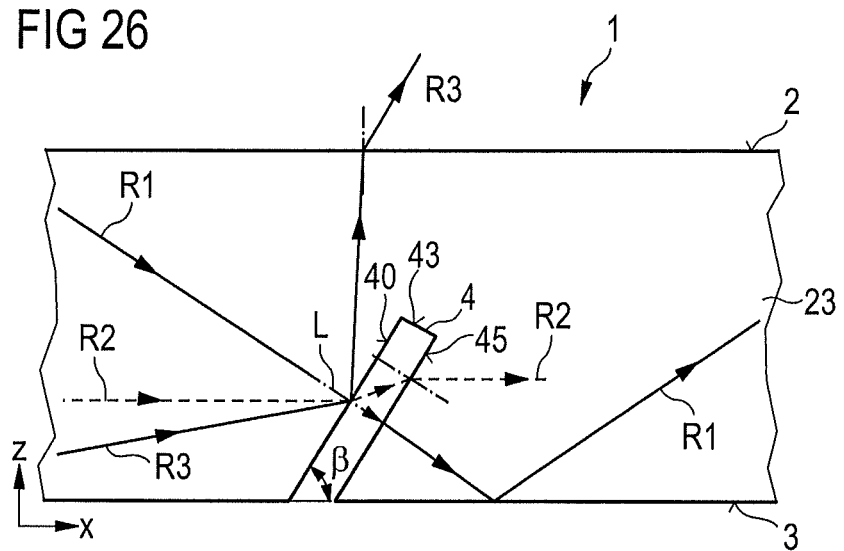

According to FIGS. 24 to 26, the outcoupling structure 4 is formed as a recess in the back face 3 of the main body 23. The emission characteristic is in each case predominantly determined by the structure main face 40. The slot-like outcoupling structure 4 with the bottom face 43 may, as an alternative to what is shown, be shaped in accordance with the bottom face 43' as in FIGS. 21 and 22. In the preferred example according to FIG. 26, rays R1, R2 which pass through the outcoupling structure 4 merely undergo a parallel offset. The outcoupling structure 4 is furthermore comparatively narrow along the main direction of light guidance x. In this way, only a very small fraction of the radiation is emitted at the back face 3 such that efficient outcoupling of the radiation at the radiation outcoupling face 2 and elevated light guidance efficiency may be achieved.

Figure 27:
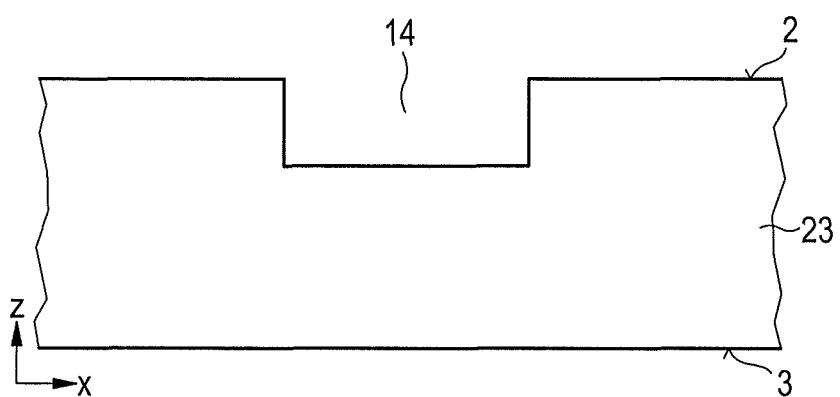

In the modification of the planar light guide according to FIG. 27 for a lighting device, all the boundary faces of the outcoupling element 14 are, when viewed in a side view, oriented parallel or perpendicular to the radiation outcoupling face 2. The outcoupling element 14 is of U-shaped cross-section. The dimensions of the outcoupling element 14 and of the planar light guide are preferably as described in connection with FIG. 2 and FIG. 13.

The planar light guides and lighting devices described herein are not restricted by the description given with reference to the examples. Rather, this disclosure encompasses any novel feature and any combination of features, including in particular any combination of features in the appended claims, even if the feature or combination is not itself explicitly indicated in the claims or examples.

The invention claimed is:
1. A planar light guide comprising:
   a main body with a back face and a radiation outcoupling face opposite thereto,
   a main direction of light guidance parallel to the radiation outcoupling face,
   at least one plurality of identically shaped and identically oriented outcoupling structures formed on at least one of the main faces, and
   at least one structure main face per outcoupling structure, wherein 1) an angle-dependent emission characteristic is provided asymmetrically in a first plane parallel to the main direction of light guidance and perpendicular to the radiation outcoupling face, 2) the outcoupling structures are constructed as a raised portion on the radiation outcoupling face, 3) radiation outcoupling proceeds both via the structure main face and via a structure back face, the structure main face is located closer to a radiation entrance face of the main body than the structure back face, and 4) the structure back face is oriented perpendicularly to the main direction of light guidance.

2. The planar light guide according to claim 1,
wherein the structure main face of the outcoupling structures is joined along the main direction of light guidance with a structure back face via a rounded portion, the structure back face being opposite the structure main face, and
the rounded portion comprises an average curvature of 5 mm$^{-1}$ to 100 mm$^{-1}$.

3. The planar light guide according to claim 1,
wherein which an average curvature of the structure main face in each case is at most 1 mm$^{-1}$.

4. The planar light guide according to claim 1,
wherein the outcoupling structures are, in a cross-section parallel to the first plane, of a sawtooth or slot shape, and
the outcoupling structures have a rectangular or square base area and the structure main faces each have an area of 0.07 mm$^2$ to 2.0 mm$^2$.

5. The planar light guide according to claim 1,
wherein the structure main faces are provided with roughening to reflect diffusely at least some of the radiation reflected at the structure main faces.

6. The planar light guide according to claim 1,
wherein at least one chamfer is formed laterally on the structure main faces of the outcoupling structures.

7. The planar light guide according to claim 1,
wherein, viewed in plan view onto the radiation outcoupling face along the main direction of light guidance, a number n of outcoupling structures per unit length obeys Formula (1), with a tolerance of at most 40% of a maximum number per unit area:

$$n(x)=n_0/(1-n_0 x) \quad (1)$$

wherein $n_0$ is a number of outcoupling structures per unit length on the radiation entrance face.

8. The planar light guide according to claim 1,
which guides radiation by way of total reflection,
and comprises no mirrors that guide radiation on the back face of the main body.

9. A planar light guide comprising:
a main body with a back face and a radiation outcoupling face opposite thereto,
a main direction of light guidance parallel to the radiation outcoupling face,
at least one plurality of identically shaped and identically oriented outcoupling structures formed on at least one of the main faces, and
at least one structure main face per outcoupling structure,
wherein an angle-dependent emission characteristic is provided asymmetrically in a first plane parallel to the main direction of light guidance and perpendicular to the radiation outcoupling face, and
wherein
a face of the outcoupling structures which precedes along the main direction of light guidance the structure main face is oriented perpendicular to the main direction of light guidance, the outcoupling structures are formed by recesses on the radiation outcoupling face and α−6°<β<93°−α and/or α+3°>β>86°−α applies, and wherein α is an angle of total reflection determined by a material of the main body and β is an average angle between the structure main face and the back face.

10. A lighting device comprising:
at least one planar light guide according to claim 1, and
at least one electrically operable light source mounted on at least one radiation entrance face of the main body of the planar light guide.

11. The lighting device according to claim 10, further comprising:
a plurality of light sources formed by light-emitting diodes, and
a diffuser on the radiation outcoupling face,
wherein the diffuser modifies an emission characteristic of the planar light guide by at most 20% of a maximum light intensity,
and the lighting device comprises no diaphragms or shading films which shade radiation emitted when in operation and/or adjust the angle-dependent emission characteristic of emitted radiation.

12. A planar light guide comprising:
a main body with a back face and a radiation outcoupling face opposite thereto,
a main direction of light guidance parallel to the radiation outcoupling face,
at least one plurality of identically shaped and identically oriented outcoupling structures formed on at least one of the main faces, and
at least one structure main face per outcoupling structure,
wherein 1) an angle-dependent emission characteristic is provided asymmetrically in a first plane parallel to the main direction of light guidance and perpendicular to the radiation outcoupling face, 2) the outcoupling structures are constructed as raised portions on the back face of the main body, an emission characteristic is adjusted by the structure main face, which is further away from a radiation entrance face than is the structure back face, and 3) the structure back face is oriented perpendicularly to the main direction of light guidance.

* * * * *